April 1, 1947.   C. L. MEHN ET AL   2,418,186
BRAKE OPERATING MEANS FOR TRACTORS
Filed Dec. 14, 1944   3 Sheets-Sheet 1

Inventors
CARL L. MEHN,
MARGARET M. MEHN,

By Clarence A. O'Brien
and Harvey B. Jacobson
Attorneys

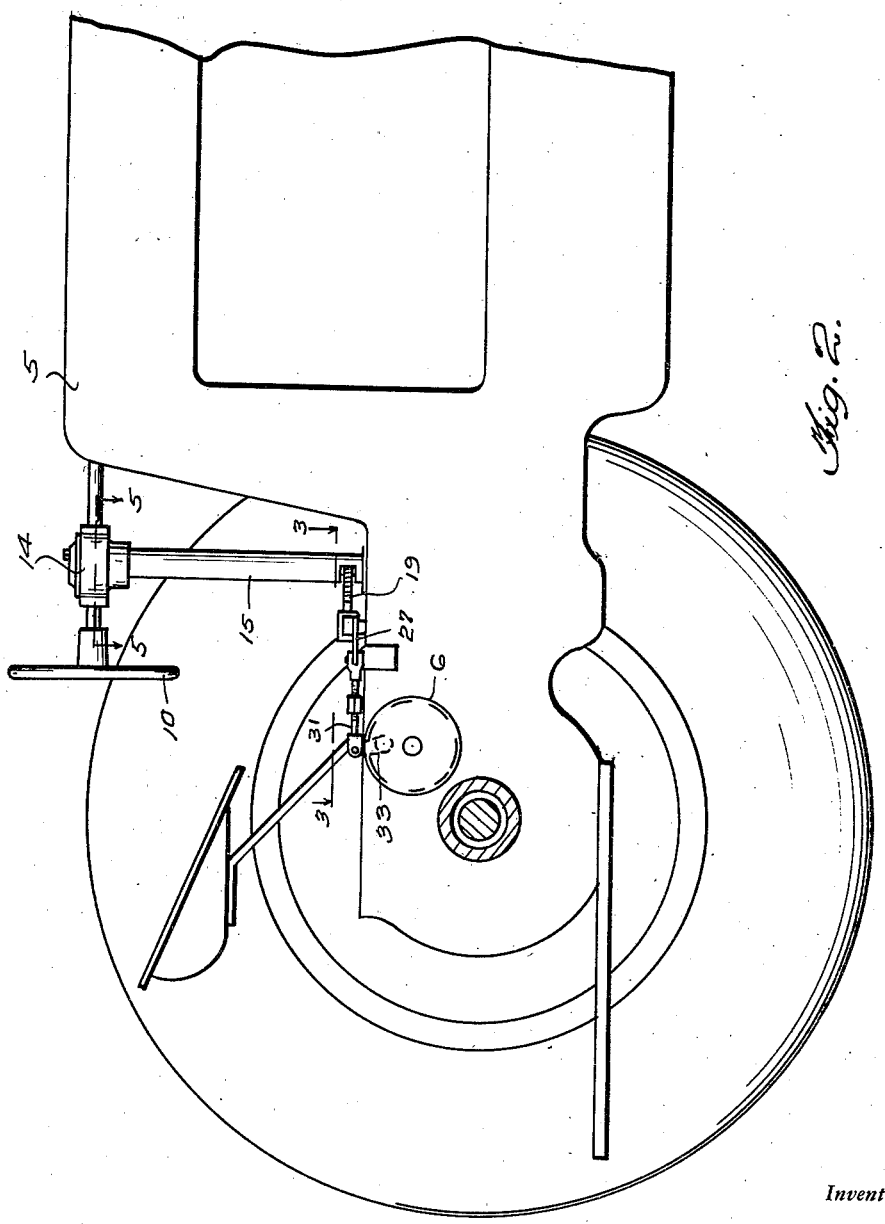

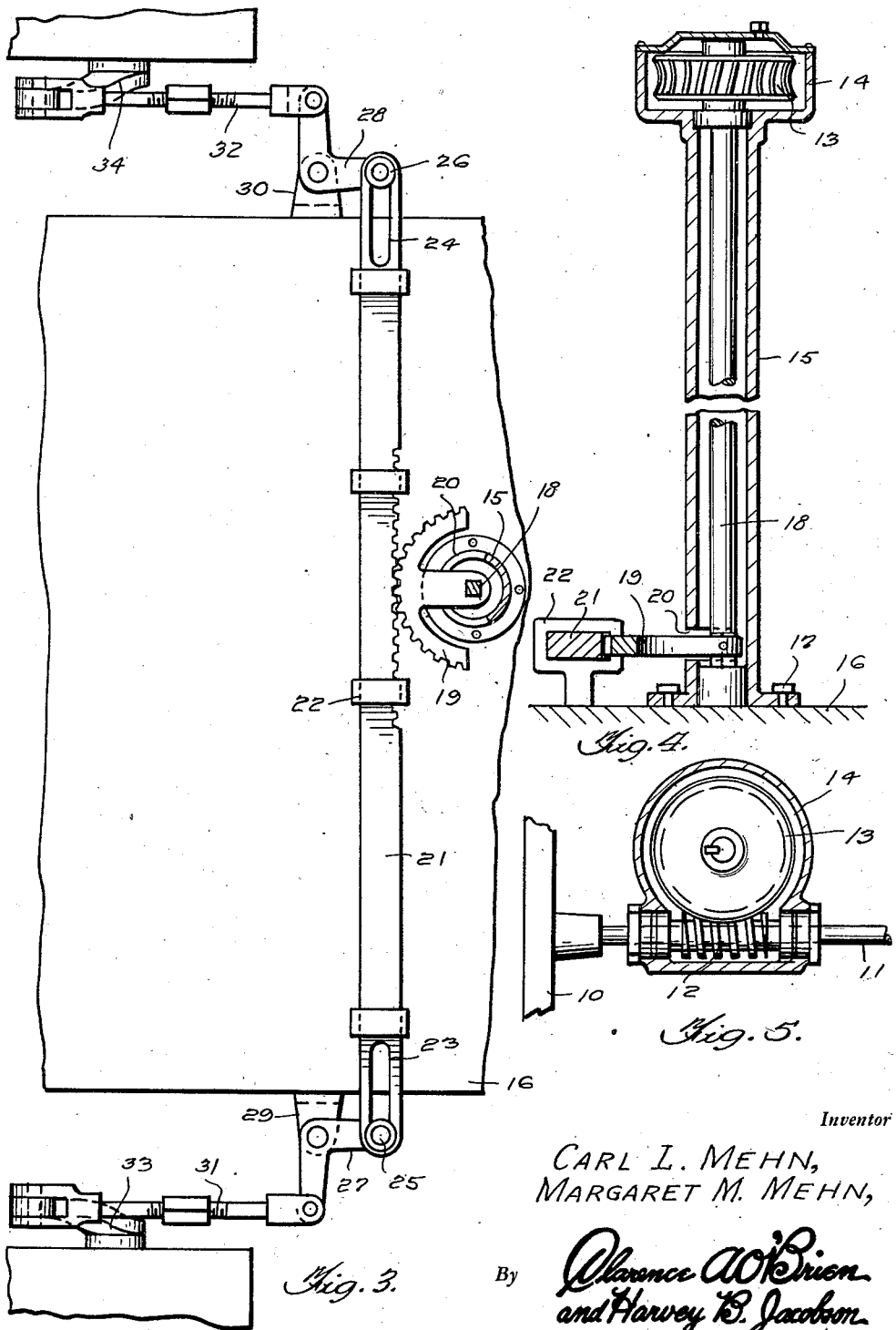

Patented Apr. 1, 1947

2,418,186

UNITED STATES PATENT OFFICE 2,418,186

BRAKE OPERATING MEANS FOR TRACTORS

Carl L. Mehn and Margaret M. Mehn, Gridley, Ill.

Application December 14, 1944, Serial No. 568,176

1 Claim. (Cl. 180—18)

The present invention relates to new and useful improvements in brake operating means for row-crop farm tractors and more particularly to a brake operating connection with the steering mechanism of the tractor whereby the brakes may be applied upon a turning of the tractor either toward the right or left.

An important object of the present invention is to operatively connect the brakes of the right and left wheels of the tractor to the steering mechanism so that one of the brakes will be applied in accordance with the direction in which the tractor is turned to facilitate the turning of the tractor in a smaller space and thus simplify the operation of the tractor and eliminate the danger of driving into fences, ditches and other obstructions by inexperienced drivers.

A further object is to provide an attachment of this character of simple and practical construction, which is efficient and reliable in performance, relatively inexpensive to manufacture and install in use, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a fragmentary side elevational view.

Figure 3 is an enlarged sectional view taken substantially on a line 3—3 of Figure 2.

Figure 4 is an enlarged vertical sectional view taken substantially on a line 4—4 of Figure 1, and Figure 5 is an enlarged sectional view taken substantially on a line 5—5 of Figure 2.

Figure 1:
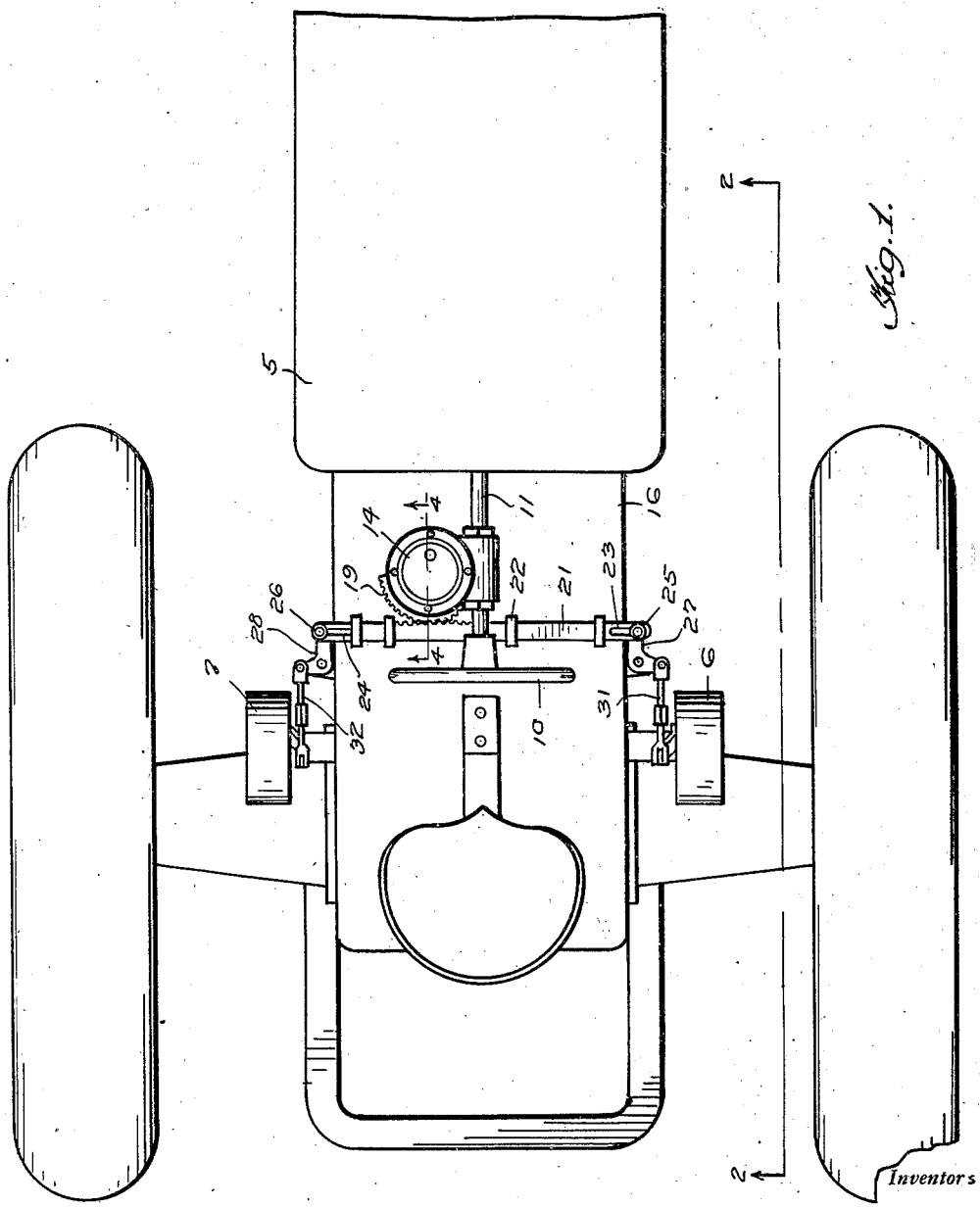
Figure 1 is a fragmentary top plan view.

Referring now to the drawings in detail wherein for the purpose of illustration I have disclosed a preferred embodiment of my invention, the numeral 5 designates a conventional farm tractor which includes the right and left brake drums 6 and 7 for the right and left rear wheels 8 and 9, respectively.

The tractor is steered by means of the steering wheel 10 and steering shaft 11 on which is secured a worm 12 engaging a worm gear 13 positioned in a housing 14 at the upper end of a tubular housing 15 bolted to the floor 16 of the tractor by bolts 17. A vertical shaft 18 is journaled in the housing 15 to the upper end of which the gear 13 is secured and to the lower end of the shaft 18 is secured a gear segment 19 projecting outwardly through an opening 20 in the housing 15.

The gear segment 19 is engaged with a rack 21 extending transversely of the tractor and slidably mounted in guides 22 secured to the floor thereof. The outer ends of the rack are formed with longitudinal slots 23 and 24 in which rollers 25 and 26 are adapted respectively to travel.

The rollers 25 and 26 are journaled at one end of bellcrank levers 27 and 28, respectively, pivoted in brackets 29 and 30 secured to the right and left sides of the tractor respectively. The levers 27 and 28 project horizontally outwardly from the sides of the tractor and to the outer ends thereof are pivotally attached rods 31 and 32 connected to the brake levers 33 and 34 of the right and left brakes.

The rollers 25 and 26 are normally positioned in the outer ends of their respective slots 23 and 24 of the rack 21 when the tractor is running in a straight direction and the brakes are then released. When the steering wheel is turned to steer the tractor toward the right, the worm 12 and worm gear 13 will turn the shaft 18 in a direction to cause a movement of the rack 21 toward the left thus exerting a pulling force on the roller 25 to apply the right hand brake. At the same time the roller 26 will travel freely in the slot 24 at the left hand end of the rack 21 and not affect that left hand brake. When the tractor is steered toward the left, the left hand brake is similarly applied.

It is believed that the details of construction and manner of use of the device will be readily understood from the foregoing without further detailed explanation.

We claim:

In combination, a tractor including right and left hand rear side wheels, right and left hand brakes for said wheels, and a steering wheel shaft extending longitudinally of the tractor and adapted to be connected to a front steering wheel for the tractor, a rack bar slidably mounted on the tractor for movement transversely thereof, said rack bar having slots at each end, bellcrank levers pivoted at the respective sides of the tractor, a roller at one end of each lever adapted to travel in the respective slots, means operatively connecting the other ends of the levers to the respective brakes, a vertical shaft operatively connected to the steering shaft and operatively engaged with the rack bar to transmit motion from the steering shaft to the rack bar for applying one of the brakes in accordance with the steering direction imparted to the steering shaft.

CARL L. MEHN.
MARGARET M. MEHN.

REFERENCES CITED

The following references are of record in the file of this patent:

UNITED STATES PATENTS

| Number | Name | Date |
|---|---|---|
| 1,127,629 | Johnson | Feb. 9, 1915 |
| 1,815,271 | Ronning et al. | July 21, 1931 |
| 1,222,260 | Brown | Apr. 10, 1917 |

FOREIGN PATENTS

| Number | Country | Date |
|---|---|---|
| 26,407 | British | Nov. 21, 1906 |
| 755,552 | French | Sept. 11, 1933 |